United States Patent [19]

Della Casa et al.

[11] Patent Number: 4,544,373
[45] Date of Patent: Oct. 1, 1985

[54] 2,4-DINITRO-2'-ACYLAMINO-4'-DIALK-YLAMINO-5'-ALKOXY-ALKYLENEOXY-1,1'-AZOBEZENE DYES

[75] Inventors: Angelo Della Casa, Basel; Peter Aeschlimann, Allschwil, both of Switzerland

[73] Assignee: Ciba-Geigy Corporation, Ardsley, N.Y.

[21] Appl. No.: 130,793

[22] Filed: Mar. 17, 1980

Related U.S. Application Data

[63] Continuation of Ser. No. 884,669, Mar. 8, 1978, abandoned.

[30] Foreign Application Priority Data

Mar. 16, 1977 [LU] Luxembourg .............................. 76959
May 4, 1977 [LU] Luxembourg .............................. 77251

[51] Int. Cl.$^4$ .................... C09B 29/24; C09B 29/26; D06P 1/18; D06P 3/54
[52] U.S. Cl. ......................................... 8/639; 534/640; 534/643; 534/644; 534/650; 534/850; 534/855
[58] Field of Search ..................... 260/207; 8/639; 534/640, 643, 644, 650, 850, 855

[56] References Cited

U.S. PATENT DOCUMENTS

| | | | |
|---|---|---|---|
| 2,083,308 | 6/1937 | Senn | 260/207 |
| 3,178,405 | 4/1965 | Merian | 260/207 |
| 3,250,762 | 5/1966 | Gies et al. | 260/207 |
| 3,342,803 | 9/1967 | Artz et al. | 260/207 |
| 3,883,504 | 5/1975 | Schickfluss et al. | 260/207 |
| 4,038,269 | 7/1977 | Groebke | 260/207 |

FOREIGN PATENT DOCUMENTS

| | | | |
|---|---|---|---|
| 663162 | 10/1969 | Belgium | 260/207 |
| 2525557 | 12/1976 | Fed. Rep. of Germany | 260/207 |
| 2077426 | 10/1971 | France | 260/207 |
| 2088374 | 1/1972 | France | 260/207 |
| 476803 | 9/1969 | Switzerland | 260/207 |
| 1152317 | 5/1969 | United Kingdom | 260/207 |

*Primary Examiner*—Floyd D. Higel
*Attorney, Agent, or Firm*—Edward McC. Roberts; Kevin T. Mansfield

[57] ABSTRACT

There are described new azo dyes of the formula

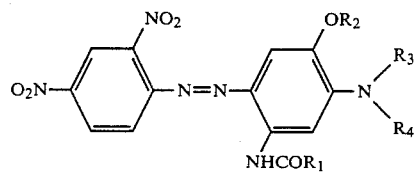

wherein $R_1$ is an optionally substituted alkyl group, $R_2$ is a substituted aliphatic radical, unsubstituted $C_3$–$C_{10}$-alkyl or cycloalkyl, and $R_3$ and $R_4$ are alkyl groups; and mixtures thereof with analogous azo dyes in which $R_4$ is H; and also the production and use of these new azo dyes and of the said mixtures thereof for dyeing and printing synthetic fibres, particularly polyester fibres. The dyes are fast to light, have good affinity to the material and a good build-up, have high coloring strength and are stable to hydrolysis.

6 Claims, No Drawings

2,4-DINITRO-2'-ACYLAMINO-4'-DIALK-YLAMINO-5'-ALKOXY-ALKYLENEOXY-1,1'-AZOBEZENE DYES

This is a continuation of application Ser. No. 884,669 filed on Mar. 8, 1978, now abandoned.

The invention relates to new azo dyes which are free from water-solubilising groups and which correspond to the formula

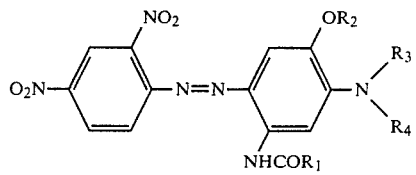

wherein $R_1$ is an optionally substituted alkyl group, $R_2$ is a substituted aliphatic radical or unsubstituted $C_3$-$C_{10}$-alkyl or cycloalkyl, and $R_3$ and $R_4$ are alkyl groups, and to mixtures thereof with analogous azo dyes of the formula (1) in which $R_4$ is H.

In preferred azo dyes, $R_1$ is an unsubstituted alkyl group, particularly the methyl or ethyl group, $R_2$ is a substituted aliphatic radical, especially an alkyl group which has 1 to 4 carbon atoms and which is substituted by alkoxy, and $R_3$ and $R_4$ are each the ethyl group.

Of interest are also azo dyes of the formula

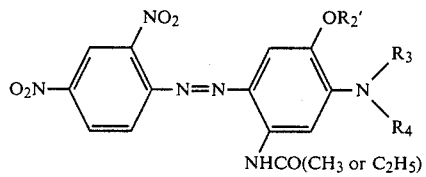

wherein $R_2'$ is a substituted alkyl group, the substituents being either Cl, Br, OH, CN or aliphatic or cycloaliphatic radicals optionally interrupted by O or S atoms, or $R_2'$ is unsubstituted alkyl having 3 to 10 carbon atoms, and $R_3$ and $R_4$ are alkyl groups; or azo dyes of the formula

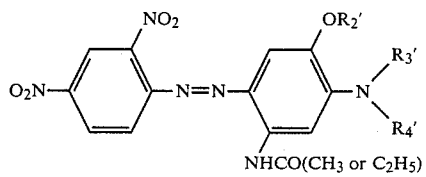

wherein $R_2'$ is a substituted alkyl group which contains a total of at most 6, preferably 1 to 4, carbon atoms, and $R_3'$ and $R_4'$ are unsubstituted alkyl groups, preferably such alkyl groups having a total of at most 8 carbon atoms, or such alkyl groups which contain per R radical 1 to 5 carbon atoms.

Also preferred are the azo dyes of the formula

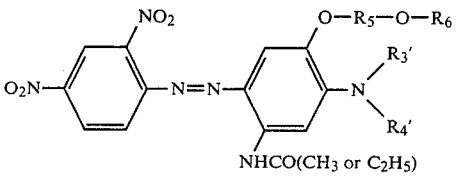

wherein $R_5$ is $C_2$-$C_3$-alkylene, $R_6$ is optionally substituted $C_1$-$C_4$-alkyl, particularly methyl or ethyl, and $R_3'$ and $R_4'$ are unsubstituted alkyl groups.

The alkyl group $R_1$ contains in particular up to 10 carbon atoms, preferably however 1 to 5 carbon atoms.

Suitable groups $R_1$ and/or $R_2$ are, e.g., those of the formulae $CH(CH_3)_2$, $CH_2CH_2Cl$, $CH_2CH_2Br$, $CHCl-CH_2Cl$, $CH_2CN$, $CH_2CH_2CN$, $CH_2-CH(OH)-CH_2Cl$, $CH_2CH_2OH$, $CH_2CH_2-O-CH_3$, $CH_2CH_2-O-C_4H_9$, $C_4H_8-O-C_4H_9$, $CH_2CH_2-O-CH_2CH_2OCH_3$, $CH_2CH_2-O-CH_2CH_2-OH$, $C_3H_6O-CH_3$, $CH_2CH_2-O-CH_2CH_2-OCOCH_3$, $CH_2CH_2-O-CH_2CH_2-CN$, cyclohexyl, cyclopentyl, $CH_2CH_2-O-COCH_2Cl$, $CH_2CH_2-O-COCHBr-CH_2Br$, $CH_2CH(OCOCH_3)-CH_2-O-C_6H_5$, $CH_2CH_2-O-CO-CH=CH_2$, $CH_2-CH(OCOCH_3)-CH_2OCOCH_3$, $(CH_2)_{1-3}-O-CO(H, CH_3, C_2H_5, C_3H_7, C_4H_9)$, $(CH_2)_{1-3}-NHCO(H, CH_3, C_2H_5, C_3H_7, C_4H_9)$, $(CH_2)_{1-3}-O-CO-O(CH_3, C_2H_5, C_3H_7, C_4H_9)$, $CH_2CH_2-O-CH_2-O-C_6H_5$ and $CH_2CH_2-O-CO-CH_2-C_6H_5$.

Further $R_1$ groups are, for example, $CH_2C_6H_5$, $CH_2CH_2C_6H_5$, $CH_2-C_6H_4-NO_2$(m-, o- or p-), $CH_2CH_2OC_6H_5$, $(CH_2)_{1-3}-O-CO-O-(C_6H_5, C_6H_4Cl, C_6H_4Br, C_6H_4OCH_3, C_6H_4CH_3)$, and $(CH_2)_{1-3}-O-CO(C_6H_5, C_6H_4Cl, C_6H_4Br, C_6H_4OCH_3, C_6H_4CH_3)$.

The invention also relates to mixtures of azo dyes, which mixtures contain 99 to 10 percent by weight, preferably 99 to 80 percent by weight, of the dialkylated azo dyes and 1 to 90 percent by weight, preferably 1 to 20 percent by weight, of the monoalkylated azo dyes.

Applied to synthetic textile materials, the new azo dyes have good properties, such as fastness to light, good affinity for the materials being dyed and a good build-up; furthermore they have a high colouring strength and are stable to hydrolysis.

These azo dyes are obtained by coupling, in a known manner, coupling components of the formula

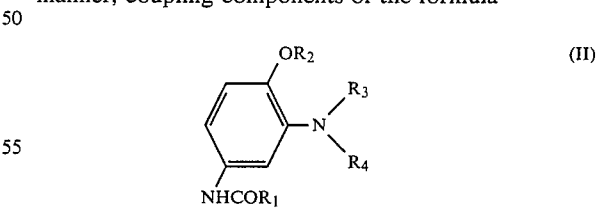

wherein $R_1$, $R_2$, $R_3$ and $R_4$ have the aforesaid meanings, and mixtures thereof with coupling components of the formula (II) in which $R_4$ is H, with diazotised 2,4-dinitroaniline.

The new water-insoluble azo dyes, their mixtures with each other, and mixtures thereof with other analogous azo dyes wherein $R_4$ is H, are excellently suitable for dyeing and printing leather, wool, silk and, in particular, synthetic fibres, such as acrylic fibres or acrylonitrile fibres from polyacrylonitrile, or from copolymers from acrylonitrile and other vinyl compounds, such as acrylic esters, acrylic amides, vinylpyridine, vinyl chloride or vinylidene chloride, or fibres from copolymers from dicyanoethylene and vinyl acetate, and also from acrylonitrile block copolymers, fibres from polyurethanes, polypropylene fibres, especially polypropylene fibres modified with metals, particularly with nickel, fibres from cellulose-tri- and -2½-acetate, and especially fibres from polyamides, such as nylon 6, nylon 6.6 or nylon 12, and fibres from aromatic polyesters, such as those from terephthalic acid and ethylene glycol, and copolymers from terephthalic acid and isophthalic acid and ethylene glycol. The dyes belong to the disperse dye class.

The present invention relates also to a process for dyeing and printing textile material based on synthetic fibres, in particular on polyester fibres, in which process there are used azo dyes which are free from water-solubilising groups and which correspond to the formula

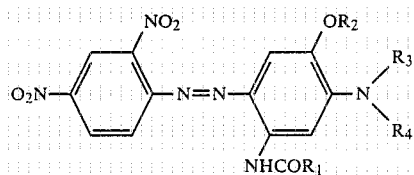

wherein $R_1$, $R_2$, $R_3$ and $R_4$ have the aforesaid meanings, and also mixtures thereof with analogous azo dyes in which $R_4$ is H.

For dyeing in aqueous liquors, the water-insoluble azo dyes according to the present invention are used advantageously in a finely divided form, and dyeing is performed with the addition of dispersing agents, such as sulphite cellulose liquor or synthetic detergents, or a combination of various wetting and dispersing agents. It is as a rule expedient to convert before dyeing the dyes to be used into a dye preparation containing a dispersing agent and finely divided dye in such a form that a fine dispersion is obtained on dilution of the dye preparations with water. Such dye preparations can be produced in a known manner, for example by grinding the dye in dry or wet form, with or without the addition of dispersing agents during the grinding operation.

To obtain strong dyeings on polyethylene terephthalate fibres, it proves advantageous to add a swelling agent to the dye bath; or to perform the dyeing process under pressure at temperatures above 100° C., for example at 130° C. Suitable swelling agents are aromatic carboxylic acids, for example salicylic acid, phenols, such as o- or p-oxydiphenyl, or aromatic halogen compounds, such as o-dichlorobenzene or diphenyl.

For thermofixing the dye, the padded polyester fabric is heated, advantageously after prior drying, e.g. in a warm stream of air, at temperatures above 100° C., for example between 180° and 210° C.

The dyeings obtained according to the present process can be subjected to an aftertreatment, for example by heating in an aqueous solution of an ion-free detergent.

The new azo dyes can be applied according to the present process by printing instead of by impregnation. For this purpose there is used, for example, a printing paste which contains the finely dispersed dye together with the auxiliaries customarily used in printing, such as wetting agents and thickening agents.

Full dyeings and printings having good fastness properties are obtained by the present process.

Full dyeings are likewise obtained with the application of the new dyes from solvents, where the dye is applied from a solvent, in which it is dissolved or is present as a fine dispersion, to the textile article to be dyed. Suitable solvents are, e.g., petroleum fractions and, in particular, chlorinated hydrocarbons (e.g. perchloroethylene), which can be used on their own, or as a dispersion together with water.

Dyeings having a particularly good build-up are obtained if the dialkylated dyes according to the invention are mixed with such dyes in which $R_4$ is H.

The new water-insoluble azo dyes can be used for the solution dyeing of polyamides, polyesters and polyolefins. The polymer is to be dyed is advantageously mixed in the form of powders, granules or chips, as a finished spinning solution or in the melted state, with the dye, which is introduced in the dry condition or in the form of a dispersion or solution in an optionally volatile solvent. After homogeneous dispersion of the dye in the solution or melt of the polymer, the mixture is processed in a known manner, by casting moulding or extrusion, into the form of fibres, yarns, monofilaments, films, and so forth.

The new azo dyes are suitable also for the so-called transfer printing process, in which the dye is firstly applied to an auxiliary carrier (e.g. paper), and then applied by heating (sublimation) to the fabric to be printed, particularly polyester fabric.

Except where otherwise stated in the Examples which follow, parts denote parts by weight, percentages are percent by weight, and temperatures are in degrees Centigrade.

EXAMPLE 1

(a) 6.9 parts of sodium nitrite are added at about 60°, with vigorous stirring, to 100 parts of concentrated sulphuric acid. There are then added at 20° to 25° 18.3 parts of 2,4-dinitroaniline, and stirring is maintained for one hour. This diazo solution is subsequently added dropwise at 0° to 5° to a solution of 28 parts of 3-N,N-diethylamino-4-(2-methoxyethoxy)-acetanilide in 300 parts of 1N sulphuric acid. The coupling is performed, by addition of 30% sodium hydroxide solution, at pH 3 to 4. The precipitated dye of the formula

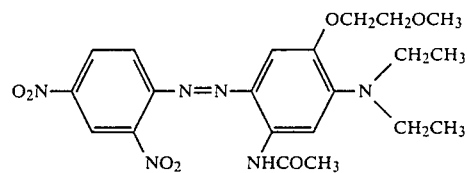

is filtered off, washed free of acid and salt, and then dried. After being ground with lignin sulphonate, this dye dyes, from an aqueous dispersion, polyethylene glycol terephthalate fibres in navy blue shades which have good fastness properties and an excellent build-up capacity.

(b) To 100 parts of concentrated sulphuric acid are added at about 60°, with vigorous stirring, 6.9 parts of sodium nitrite. There are then introduced at 20° to 25° 18.3 parts of 2,4-dinitroaniline, and stirring is maintained for one hour. This diazo solution is subsequently added dropwise at 0° to 5° to a solution of 26.46 parts of 3-N,N-diethylamino-4-(2-methoxyethoxy)-propionanilide and 2.66 parts of 3-N-monoethylamino-4-(2-methoxyethoxy)-propionanilide in 300 parts of 1N sulphuric acid. The coupling is performed at pH 3 to 4 by the addition of 30% sodium hydroxide solution. The dye mixture which precipitates contains the dyes of the formulae

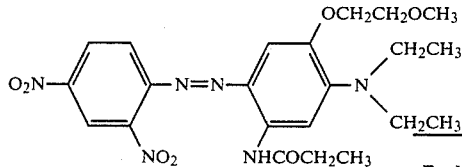

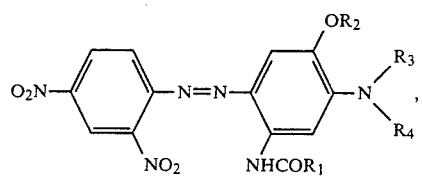

which are listed in the following Table, are produced in a manner analogous to that described in part (a).

TABLE

| Ex. No. | $R_1$ | $R_2$ | $R_3$ | $R_4$ | Shade on polyester |
|---|---|---|---|---|---|
| 2 | —$C_2H_5$ | —$C_2H_4OCH_3$ | —$C_2H_5$ | —$C_2H_5$ | navy blue |
| 3 | —$CH_3$ | " | —$CH_3$ | —$CH_3$ | " |
| 4 | " | " | —$C_3H_7$ | —$C_3H_7$ | " |
| 5 | " | —$C_2H_4OC_2H_5$ | —$C_2H_5$ | —$C_2H_5$ | " |
| 6 | " | —$C_2H_4O$—⟨H⟩ | " | " | " |
| 7 | " | —$CH(CH_3)_2$ | " | " | " |
| 8 | —$C_2H_5$ | " | " | " | " |
| 9 | " | —$(CH_2)_3OCH_3$ | " | " | " |
| 10 | —$CH_3$ | —$C_2H_4OCH(CH_3)_2$ | " | " | " |
| 11 | —$C_2H_5$ | —$C_2H_4OC_2H_4CN$ | " | " | " |
| 12 | —$CH_3$ | ⟨H⟩ | " | " | " |
| 13 | —$C_2H_5$ | n-$C_3H_7$ | " | " | " |
| 14 | —$CH_3$ | n-$C_4H_9$ | " | " | " |
| 15 | " | —$C_2H_4OH$ | " | " | " |
| 16 | " | —$C_2H_4CN$ | " | " | " |
| 17 | —$CH_2OCH_3$ | —$C_2H_4OCH_3$ | " | " | " |
| 18 | —$CH_2CH_2Cl$ | " | " | " | " |
| 19 | —$CH_2CN$ | " | " | " | " |
| 20 | —$CH_3$ | —$C_2H_4Cl$ | " | " | " |

If the dialkylated coupling components corresponding to the Examples 2, 10, 13 and 15 in the Table are mixed, exactly as in the preceding Example (b), in the same mixing ratio with the corresponding monoalkylated coupling components, there are obtained, after coupling, dye mixtures which dye in navy blue shades and which have an excellent affinity for the material being dyed and good fastness properties.

We claim:

1. An azo dye of the formula

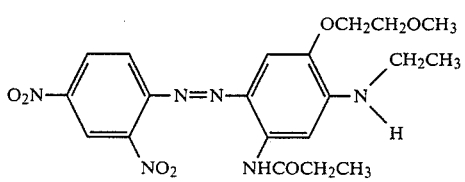

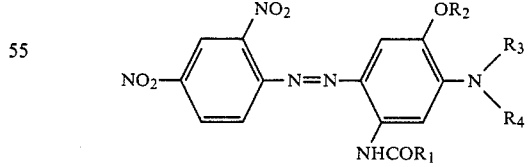

It is filtered off, washed free of acid and salt, and then dried. After being ground with lignin sulphonate, this dye mixture dyes, from an aqueous dispersion, polyethylene glycol terephthalate fibres in navy blue shades which have good fastness properties and an excellent build-up capacity.

The azo dyes of the formula wherein
$R_1$ is methyl or ethyl,
$R_2$ is alkyl of 1 to 4 carbon atoms which is substituted by alkoxy of 1 to 4 carbon atoms, and
$R_3$ and $R_4$ are ethyl;
or mixtures of said dye with a dye of said formula, wherein $R_1$, $R_2$ and $R_3$ are selected as above, but wherein $R_4$ is hydrogen.

2. An azo dye according to claim 1, which corresponds to the formula

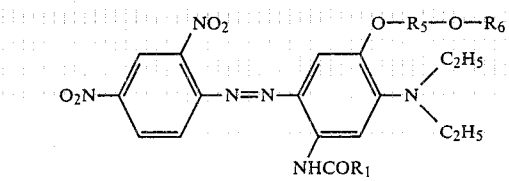

wherein $R_5$ is $C_2$-$C_3$-alkylene and $R_6$ is $C_1$-$C_4$-alkyl.

3. An azo dye according to claim 2, wherein $R_6$ is methyl or ethyl.

4. A mixture of azo dyes according to claim 1, which contains 99 to 10 percent by weight of the dye wherein $R_4$ is ethyl and 1 to 90 percent by weight of the dye wherein $R_4$ is hydrogen.

5. An azo dye mixture according to claim 4, which contains 99 to 80 percent by weight of the dye wherein $R_4$ is ethyl and 1 to 20 percent by weight of the dye wherein $R_4$ is hydrogen.

6. An azo dye according to claim 1, which corresponds to the formula

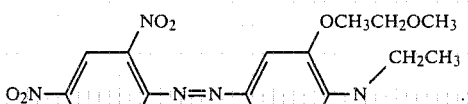

* * * * *